No. 699,433. Patented May 6, 1902.
R. L. YOUNG.
SPARKING IGNITER FOR EXPLOSIVE ENGINES.
(Application filed July 8, 1901.)
(No Model.)

Witnesses:
C. N. Keeney.
Anna V. Faust.

Inventor:
Richard L. Young.
By Benedict & Morsell.
Attorneys.

UNITED STATES PATENT OFFICE.

RICHARD L. YOUNG, OF MILWAUKEE, WISCONSIN, ASSIGNOR OF ONE-HALF TO THOMAS J. PRICE, OF MILWAUKEE, WISCONSIN.

SPARKING IGNITER FOR EXPLOSIVE-ENGINES.

SPECIFICATION forming part of Letters Patent No. 699,433, dated May 6, 1902.

Application filed July 8, 1901. Serial No. 67,446. (No model.)

*To all whom it may concern:*

Be it known that I, RICHARD L. YOUNG, residing at Milwaukee, in the county of Milwaukee and State of Wisconsin, have invented a new and useful Improvement in Sparking Igniters for Explosive-Engines, of which the following is a description, reference being had to the accompanying drawings, which are a part of this specification.

My invention has relation to improvements in sparking igniters for explosive-engines.

The object of the invention is to provide a simple and efficient mechanism of the construction hereinafter set forth for producing the spark, and thereby igniting the explosive charge.

With the above primary and other incidental objects in view the invention consists of the devices and parts or their equivalents, as hereinafter more fully set forth.

Figure 1:
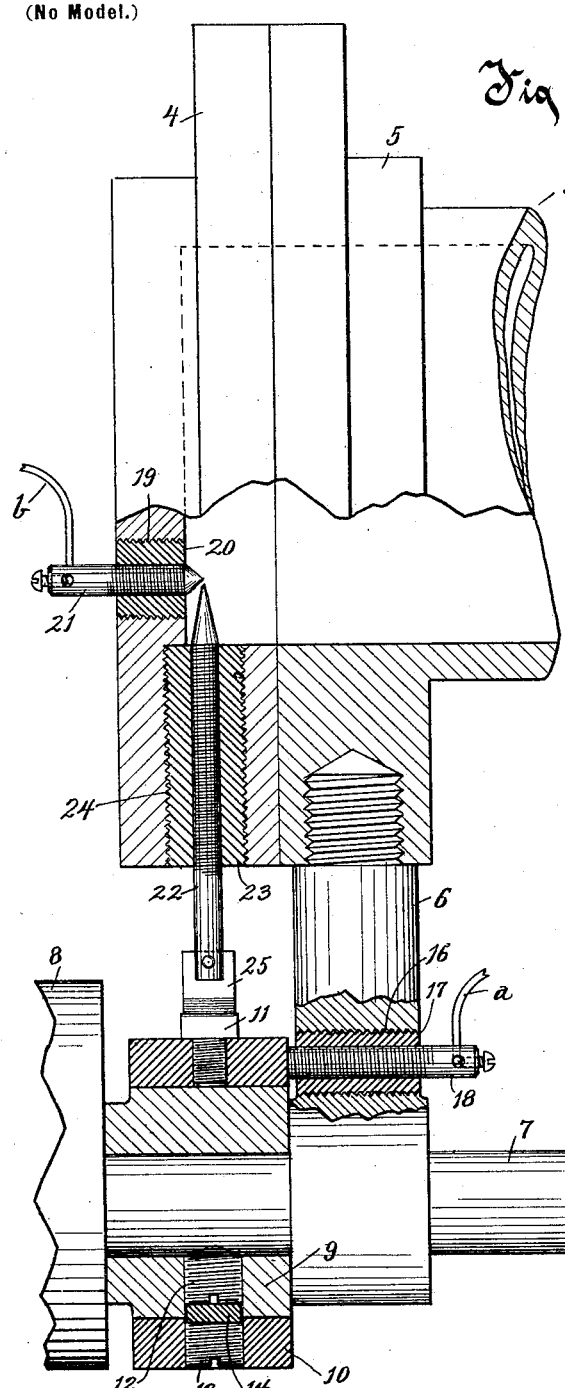
Figure 2:
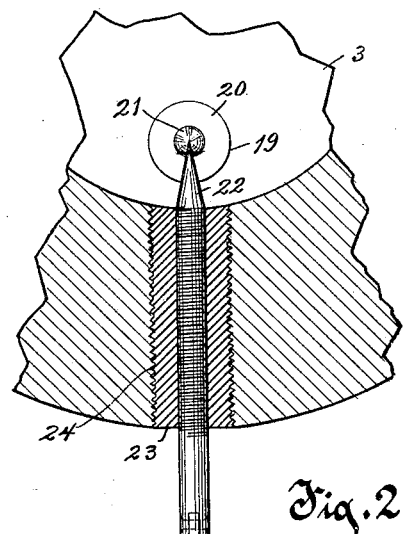

In the accompanying drawings, Figure 1 is an elevation of my invention, certain parts being broken away and in section and showing only a fragment of the cylinder of the engine; and Fig. 2 is a view at right angles to Fig. 1.

Referring to the drawings, the numeral 3 indicates the cylinder of an ordinary form of gasolene or gas engine, 4 the head of the cylinder, and 5 the flange of said cylinder, to which the head is bolted. Secured to the cylinder, preferably by a threaded connection, so as to be capable of adjustment, is a bracket 6, the outer end of said bracket provided with an opening which forms a bearing for a shaft 7, said shaft having a cam 8 mounted thereon. This shaft may be driven from the engine by any suitable means, preferably by a gearing (not shown) between it and the crank-shaft of the engine. Surrounding the cam-shaft is a sleeve 9, preferably of hard rubber or some other suitable non-conductor of electricity. Surrounding in turn the sleeve 9 is a metallic ring 10, preferably of copper. Projecting peripherally from the ring 10 and connected adjustably thereto, preferably by a screw-thread connection, is a contact-stud 11.

The sleeve 9 is secured to the cam-shaft by any desirable means, but preferably by a set-screw 12, said screw being held firmly in place by means of another screw 13, an insulating-strip 14 of hard rubber or other suitable insulating material being placed between the two screws to prevent the electrical current from passing from the ring 10 to the cam-shaft. It will be evident that by removing the screw 13 access can be readily obtained to the set-screw 12 for the purpose of adjusting or removing said screw.

The outer metallic ring 10 is secured to the sleeve 9 by any desirable means, but preferably by a series of set-screws 15, which extend through said ring and enter the sleeve 9, their inner ends of course terminating short of the cam-shaft, so as to insure against the electrical current passing to said shaft.

The bracket 6 is provided transversely thereof with a threaded opening 16, into which is screwed an exteriorly-threaded bushing 17, composed of hard rubber or other suitable insulating material. Fitting in the bushing is a metallic rod 18, preferably of copper. This rod preferably has a threaded connection with the interior of the bushing, so as to be adjustable therein, and is turned sufficiently far to cause one of its ends to always contact with the metallic ring 10. To the opposite end of the rod 18 is connected an electrical conductor *a*, which connects with any suitable source of electrical energy.

Through the head of the cylinder is provided an opening 19, and in this opening is adjustably fitted, by means of screw-threads, a bushing 20, of hard rubber or other suitable insulating material. Fitting in this bushing is a metallic rod, preferably of copper and forming one electrode 21 of the sparking mechanism. One end of this electrode is preferably pointed and extends into the cylinder for a desired distance. The other electrode 22, consisting of a metallic rod, preferably of copper, is fitted in a bushing 23, of hard rubber or other suitable insulating material. This bushing is also adjustably fitted in a threaded opening 24 in the cylinder-head, said opening being preferably at right angles to the opening 19. The inner end of the electrode 22 is also preferably pointed. To the outer end of the electrode 21 is connected the end of an electrical conductor *b*, which also extends to the source of electrical energy.

The outer end of the electrode 22 is provided with a contact-plate 25, said plate being preferably of steel and also having its outer edge advisably beveled. The electrode 22 is so positioned that the plate 25, carried thereby, will be contacted with by the stud 11 once in every revolution of the cam-shaft.

It will be noticed that the rod 18 is always in contact with the ring 10, and hence said rod acts in a somewhat similar manner to the brush of a dynamo-commutator.

In the operation of the invention the electrical spark in the cylinder will take place when the stud 11 makes contact with the plate 25, which occurs once in each revolution of the cam-shaft. The ring 10 is set in proper position, so that the spark will take place when the inlet gas-valve (not shown) has just closed. When the stud 11 passes the plate 25, contact is of course broken and will not take place again until shaft 7 completes another revolution, which will occur upon every second stroke of the engine, the gears being two to one.

From the above description it will be seen that I provide a most simple form of igniting mechanism. Provision is also made for thoroughly insulating the electrically-energized parts, and ample means are also provided for obtaining ready adjustment of all parts which from time to time may require adjustment.

What I claim as my invention is—

1. In a sparking igniter for explosive-engines, the combination of a cylinder, electrodes extending into said cylinder and insulated therefrom, an electrical conductor extending from one of said electrodes and leading to the source of electrical supply, a rotatable cam-shaft, an insulating-sleeve mounted thereon, a metallic ring secured to and surrounding the sleeve, and provided with a contact-stud projecting therefrom and adapted to make contact with the outer end of one of the electrodes on each revolution of the cam-shaft, a metallic rod having one end in contact with the metallic ring, and an electrical conductor connecting said rod with the source of electrical supply.

2. In a sparking igniter for explosive-engines, the combination of a cylinder, electrodes extending into said cylinder and insulated therefrom, an electrical conductor extending from one of said electrodes and leading to the source of electrical supply, a contact-plate secured to the outer end of the other electrode, a rotatable cam-shaft, an insulating-sleeve mounted thereon, a metallic ring secured to and surrounding the sleeve, and provided with a contact-stud adapted to make contact with the contact-plate of the electrode on each revolution of the cam-shaft, a metallic rod having one end in contact with the metallic ring, and an electrical conductor connecting said rod with the source of electrical supply.

3. In a sparking igniter for explosive-engines, the combination of a cylinder, electrodes extending into said cylinder and insulated therefrom, an electrical conductor extending from one of said electrodes and leading to the source of electrical supply, a rotatable cam-shaft, an insulating-sleeve mounted thereon, a set-screw passing through said sleeve and turned against the cam-shaft, a metallic ring secured to and surrounding the sleeve, and provided with a contact-stud projecting therefrom and adapted to make contact with the outer end of one of the electrodes on each revolution of the cam-shaft, a screw inserted in the ring, and in line with the set-screw, an insulating-strip between the two screws, a metallic rod having one end in contact with the metallic ring, and an electrical conductor connecting said rod with the source of electrical supply.

4. In a sparking igniter for explosive-engines, the combination of a cylinder, electrodes extending into said cylinder and insulated therefrom, an electrical conductor extending from one of said electrodes and leading to the source of electrical supply, a bracket extending from the cylinder, a rotatable cam-shaft having its bearing in an opening in the bracket, an insulating-sleeve mounted on the cam-shaft, a metallic ring secured to and surrounding the sleeve, and provided with a contact-stud projecting therefrom and adapted to make contact with the outer end of one of the electrodes on each revolution of the cam-shaft, a metallic rod having one end in contact with the metallic ring, and an electrical conductor connecting said rod with the source of electrical supply.

5. In a sparking igniter for explosive-engines, the combination of a cylinder, electrodes extending into said cylinder and insulated therefrom, an electrical conductor extending from one of said electrodes and leading to the source of electrical supply, a bracket extending from and adjustably secured to the cylinder, a rotatable cam-shaft having its bearing in an opening in the bracket, an insulating-sleeve mounted on the cam-shaft, a metallic ring secured to and surrounding the sleeve, and provided with a contact-stud projecting therefrom and adapted to make contact with the outer end of one of the electrodes on each revolution of the cam-shaft, a metallic rod having one end in contact with the metallic ring, and an electrical conductor connecting said rod with the source of electrical supply.

6. In a sparking igniter for explosive-engines, the combination of a cylinder, electrodes extending into said cylinder and insulated therefrom, an electrical conductor extending from one of said electrodes and leading to the source of electrical supply, a bracket extending from the cylinder, a rotatable cam-shaft having its bearing in an opening in the bracket, an insulating-sleeve mounted on the cam-shaft, a metallic ring secured to and surrounding the sleeve, and provided with a contact-stud projecting therefrom and adapted to make contact with the outer end of one of the electrodes on each revolution of the cam-shaft, a metallic rod disposed in a transverse opening in the bracket and having one end in contact with the metallic ring, and an electrical conductor connecting said rod with the source of electrical supply.

7. In a sparking igniter for explosive-engines, the combination of a cylinder, electrodes extending into said cylinder and insulated therefrom, an electrical conductor extending from one of said electrodes and leading to the source of electrical supply, a rotatable cam-shaft, an insulating-sleeve mounted thereon, a metallic ring secured to and surrounding the sleeve, and provided with a contact-stud projecting therefrom and adapted to make contact with the outer end of one of the electrodes on each revolution of the cam-shaft, a longitudinally-adjustable metallic rod having one end in contact with the metallic ring, and an electrical conductor connecting said rod with the source of electrical supply.

In testimony whereof I affix my signature in presence of two witnesses.

RICHARD L. YOUNG.

Witnesses:
   L. B. MALLORY,
   R. T. HAZEL.